United States Patent [19]

Ratke et al.

[11] Patent Number: 4,887,702
[45] Date of Patent: Dec. 19, 1989

[54] BRAKE/SHIFT INTERLOCK FOR AN AUTOMATIC TRANSMISSION SHIFT CONTROL MECHANISM

[75] Inventors: Richard Ratke, Dearborn; Donald E. Ellison, St. Clair Shores, both of Mich.

[73] Assignee: United Technologies Automotive, Inc., Dearborn, Mich.

[21] Appl. No.: 206,255

[22] Filed: Jun. 13, 1988

[51] Int. Cl.[4] .................... B60K 41/26; B60K 41/04; H01F 7/08
[52] U.S. Cl. .................................. 192/4 A; 70/248; 70/254; 74/878; 335/255
[58] Field of Search ............... 192/4 A, 4 C; 70/248, 70/254; 74/878; 335/255, 261

[56] References Cited

U.S. PATENT DOCUMENTS

| | | | |
|---|---|---|---|
| 2,102,761 | 12/1937 | Strobel | 335/261 X |
| 2,437,406 | 3/1948 | Rogers | 335/255 X |
| 3,629,747 | 12/1971 | Findley, Jr. | 335/255 X |
| 3,942,614 | 3/1976 | Thompson | 192/4 A |
| 4,096,930 | 6/1978 | Viscardi | 192/4 A |
| 4,097,833 | 6/1978 | Myers | 335/261 |
| 4,473,141 | 9/1984 | Mochida | 192/4 A X |
| 4,474,085 | 10/1984 | Devogeleare et al. | 74/483 PB X |
| 4,513,276 | 4/1985 | Kubota et al. | 340/52 R |
| 4,532,824 | 8/1985 | Lamy et al. | 74/475 |
| 4,660,443 | 4/1987 | Simancik | 74/878 |

FOREIGN PATENT DOCUMENTS

| | | | |
|---|---|---|---|
| 2139510 | 2/1973 | Fed. Rep. of Germany | 335/255 |
| 55-63809 | 5/1980 | Japan | 335/255 |
| 56-70613 | 6/1981 | Japan | 335/255 |
| 2104730 | 3/1983 | United Kingdom | 335/255 |

*Primary Examiner*—Allan D. Herrmann

[57] ABSTRACT

A brake/shift interlock is provided in, or for use in, a vehicle having a shift mechanism for an automatic transmission. The shift mechanism includes a shift lever and a detent mechanism having a latch and latch plate. The latch plate has a detent notch at a Park position. A Park/Lock member is actuable to lock the latch in the Park position. In addition to an ignition lock mechanism for actuating the Park/Lock member as a function of the status of the ignition switch, a brake/shift interlock is also provided for actuating the Park/Lock member while the ignition switch is in the Run position except for being released during actuation of a brake switch. A solenoid is energized to apply a tensioning force to the Park/Lock member via a cable to thereby actuate the member. The brake/shift interlock may be mechanically in series or in parallel with the ignition lock mechanism. In the series mechanical arrangement, the solenoid may have the cable of the ignition lock mechanism extending axially through its hollow plunger in fixed engagement therewith.

18 Claims, 7 Drawing Sheets

BRAKE/SHIFT INTERLOCK FOR AN AUTOMATIC TRANSMISSION SHIFT CONTROL MECHANISM

DESCRIPTION

1. Technical Field

This invention relates to the shift control mechanism for an automatic transmission and more particularly to a brake/shift interlock for the shift control mechanism of an automatic transmission in a vehicle such as an automobile or the like.

2. Background Art

In vehicles such as automobiles, it is common to employ an automatic transmission. The transmission is capable of being placed in either a Park mode or various non-Park modes by manual actuation of a shift control mechanism. The non-Park modes typically include Reverse, Neutral, Drive, Second and First. The shift control mechanism typically includes a shift lever which is either floor mounted or may be column mounted on the steering column. In most such shift control mechanisms there is provided a detent mechanism which interacts with the shift lever to aid in maintaining it in a selected position associated with a selected transmission mode.

Many such automatic transmission shift control mechanisms include provision for locking the shift lever in the Park detent position while the ignition switch is in the Off position. This aids in theft prevention. An example of such an arrangement is present in U.S. Pat. No. 4,474,085 in which a pivotable shift lever has a pushbutton operated detent mechanism which is operatively connected with a Park/Lock lever pivotally mounted on the shift control mechanism. The Park/Lock lever is controlled by actuation of the vehicle ignition lock.

Still further, where there is some concern that a gear shift lever might inadvertently be left in a pseudo-park position which allows dislodgement by shock or vibration, possibly into Reverse, provision has been made to insure that the detent pin does find its way into the actual Park detent slot rather than to dwell at some unacceptable intermediate position. Such arrangement is depicted and disclosed in U.S. Pat. No. 4,473,141 in which a plunger actuated by an electromagnet acts, when not energized, to insure proper final positioning and retention of the detent pin in the Park position. When the electromagnet is energized, the plunger retracts and the detent pin is freed to allow actuation of the gear shift lever. The electromagnet is connected in series with a park brake switch and the ignition switch such that when the engine is running and the park brake is actuated, the plunger retracts.

More recently, a concern has developed regarding a condition termed "sudden acceleration" in which the vehicle may lurch forward or backward when the gear shift lever is moved from Park to one of the non-Park positions such as Reverse or Drive. One technique for minimizing or preventing problem acceleration is to require that the brakes be applied while shifting out of the Park position. While this may normally be good operating practice, it is preferable to provide an interlock which effectively requires that response. One such brake/shift interlock of which Applicants are aware requires, in addition to the existing shift control mechanism having a key-actuated interlock cam, or Park/Lock member, (hereinafter P/L member), a further brake interlock cam for blocking the P/L member, a solenoid having a plunger and rigid arm extensible to actuate the brake interlock cam into actuating engagement with the P/L member when the ignition switch is in the Run position and being deactivated when the vehicle's brake is actuated, and a switch for detecting when the shift control mechanism is in the Park position in order to inhibit operation of the solenoid during brake actuation when other than in Park so as to prevent the noise and wear associated with its actuation.

Accordingly, it is a principal object of the present invention to provide an improved brake/shift interlock for the shift control mechanism associated with the automatic transmission of a vehicle.

It is a further object to provide an improved electromagnetic actuator assembly useful in such brake/shift interlock mechanism.

It is a still further object of the invention to provide such improved brake/shift interlock in combination with the shift control mechanism for an automatic transmission.

As part of the foregoing general objects, it is a further object to provide a reliable brake/shift interlock which may be economically added to an existing shift control mechanism.

It is a further object of the invention to provide an electromagnetic actuator for the brake/shift interlock of a design which permits an economy of functions.

DISCLOSURE OF INVENTION

According to the invention there is provided a brake/shift interlock for use in a vehicle having a shift control mechanism for an automatic transmission. The transmission has a Park mode and non-Park modes. The shift control mechanism includes a shift lever for controlling selection of the transmission modes and further includes a detent mechanism having a latch and a latch plate. The latch plate includes several detent notches, one of which corresponds with a Park position. The latch is adapted to be in detented engagement with respective ones of the detent notches and is selectively, manually actuable out of said detented engagement with a respective detent notch. The shift control mechanism further includes a P/L member actuable to lock the latch in the Park position detent notch. The vehicle includes an ignition switch having Off and Run positions, and an ignition lock mechanism is associated with the ignition switch and is connected with the P/L member for actuating that member to a Lock position to maintain the latch locked in the Park position detent notch when the ignition switch is in its Off position. The vehicle further includes a brake switch connected in an electrical power circuit and adapted to be actuated in conjunction with actuation of a brake pedal or the like. The brake/shift interlock comprises an electromagnetic actuator such as a solenoid and includes means such as a flexible cable or the like for mechanically connecting it directly with the P/L member. The solenoid is adapted to be connected electrically in the brake light power circuit which includes the brake switch so as to control its actuation as a function of the actuation of that brake switch. Energization of the solenoid serves to tension the connecting means which join the solenoid with the P/L member to thereby urge and/or that member in the Lock position.

The P/L member is mounted on a pivot axis and the ignition lock mechanism operates to apply an off-axis force to that member to actuate it toward said Lock position to lock the latch in the Park position. Moreover, the brake/shift interlock is connected with the P/L member in a similar off-axis manner to effect the same response of the P/L member when the solenoid is energized.

In one embodiment of the invention, the solenoid and its connecting means exists mechanically in parallel with the ignition lock mechanism. In another perhaps preferred embodiment of the invention, the solenoid and its connecting means are arranged mechanically in series with the ignition lock mechanism. More specifically, the latter embodiment employs a cable normally associated with the ignition lock mechanism to also provide the connecting means associated with the brake/shift interlock solenoid.

Still further, and in accordance with a further aspect of the invention, the brake/shift interlock solenoid may be of a novel construction in which an opening extends axially through the solenoid housing and thus also through the solenoid's plunger. The cable of the ignition lock mechanism passes through the solenoid housing and its plunger for connection with the P/L member at one end and with the ignition lock mechanism at the other. The solenoid plunger is in fixed engagement with the cable such that the two are moved in unison relative to the solenoid.

The power circuit in which the brake/shift solenoid is connected employs a battery potential applied to one side of the ignition switch, the other side of the ignition switch is connected to one side of the solenoid, the other side of the solenoid is connected to a junction which includes one side of a brake lamp and one side of the brake switch, the other side of the brake lamp is connected to ground potential and the other side of the brake switch is connected to the battery potential. The solenoid is thus energized through the lamp when the ignition switch is in the Run position, however when the brake switch is actuated the voltage difference across the solenoid will be nil, thereby causing its de-energization.

BEST MODE FOR CARRYING OUT THE INVENTION

Figure 1:
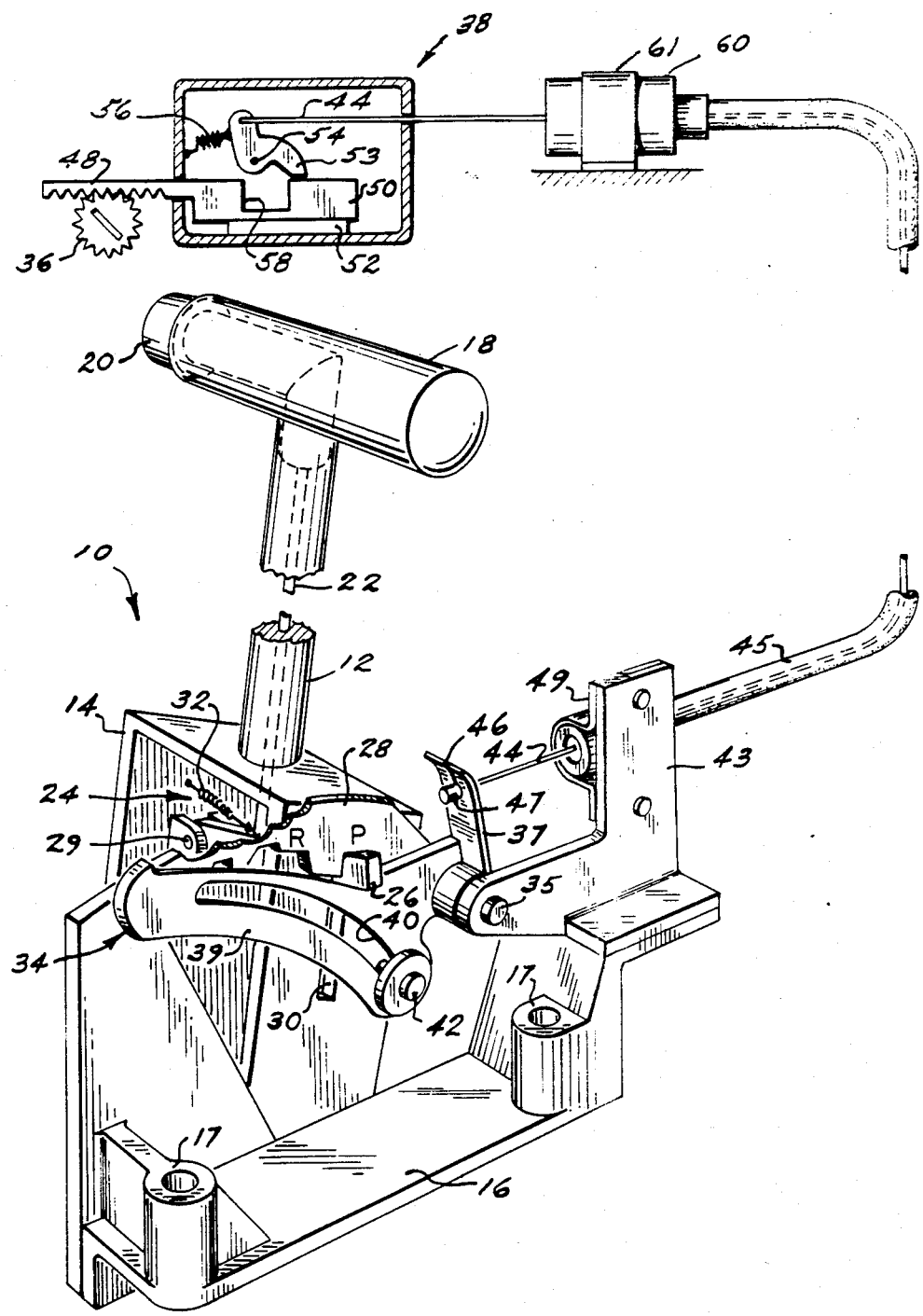
FIG. 1 depicts the brake/shift interlock of one embodiment of the invention in combination with a shift control mechanism for an automatic transmission, and shown in the locked Park position.
Figure 2:
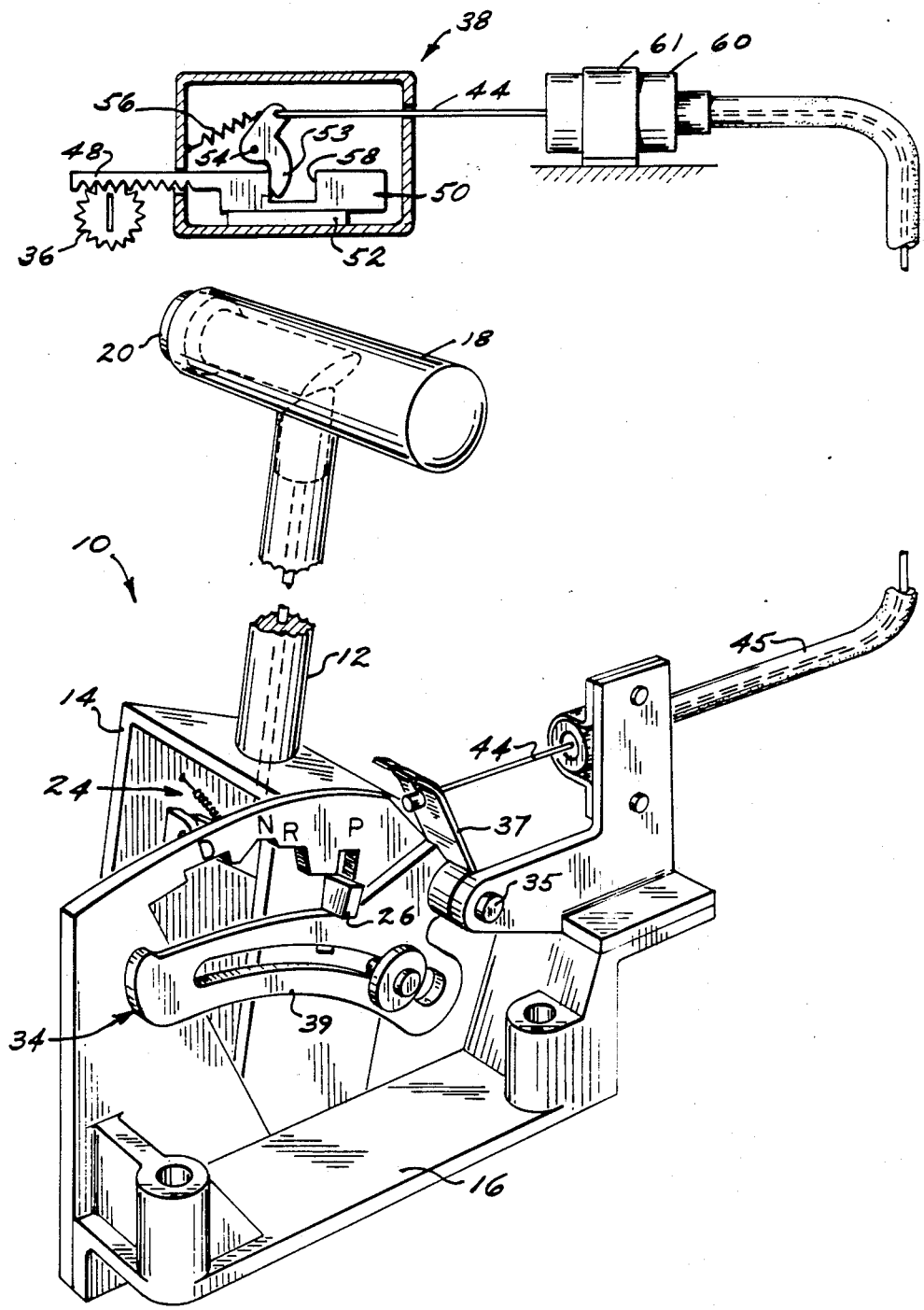
FIG. 2 depicts the brake/shift interlock and shift control mechanism of FIG. 1, and shown in the unlocked Park position.
Figure 3:
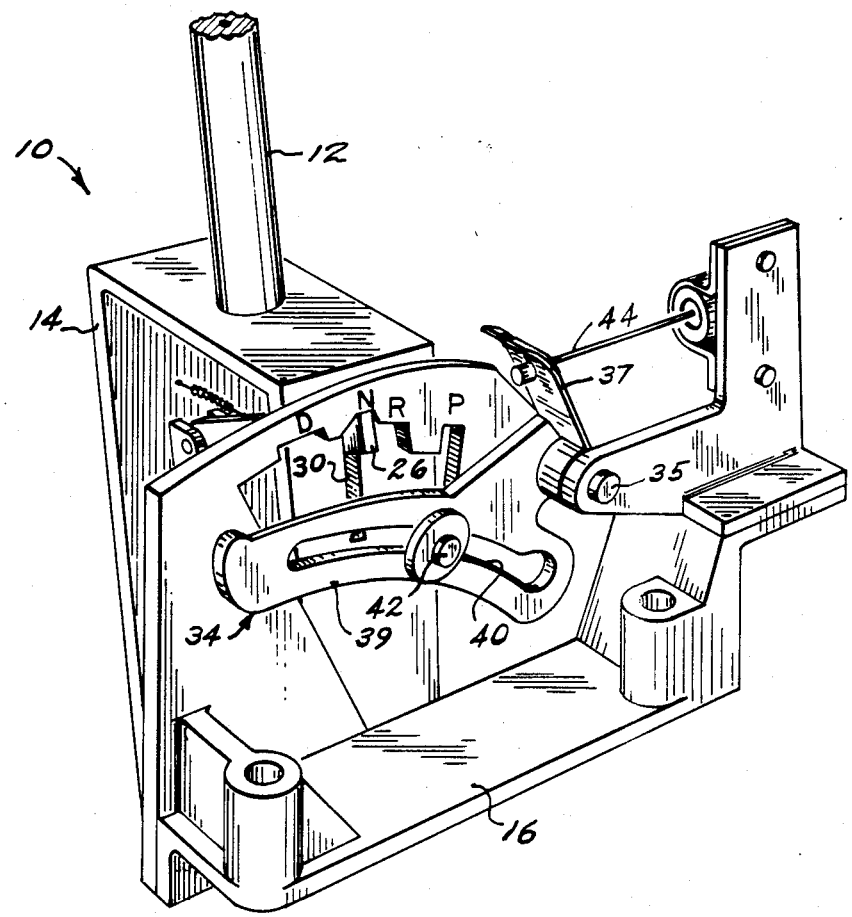
FIG. 3 depicts the brake/shift interlock and shift control mechanism of FIGS. 1 and 2, and shown in a non-Park position.

Referring to FIGS. 1-3, and initially to FIG. 1, there is depicted a shift control mechanism, generally designated 10, for an automatic transmission (not shown). The shift control mechanism 10, or simply shift control 10, is depicted as being of the type which is floor mounted in the vehicle (not shown), though it will be appreciated that the following disclosed principles of the invention would be similarly applicable to a shift control mounted elsewhere in the vehicle, as for instance on the steering column. Moreover, while the shift control 10 depicted in the figures herein is of a particular type typically found in vehicles manufactured by Ford Motor Company, it will be appreciated that the brake/shift interlock of the invention is similarly applicable to shift controls of other similar, but not identical, construction, as for instance disclosed in the aforementioned U.S. Pat. No. 4,473,141 and U.S. Pat. No. 4,474,085. Resort may be made to the disclosures of those aforementioned patents for a more complete understanding of various shift control mechanisms as they relate in common to the present invention but are not described in detail herein.

Shift control 10 includes a shift lever 12 secured to a bracket or yoke 14 which is pivotally mounted on a base member 16 in a conventional manner (not shown) for movement about a respective pivot axis. The base member 16 is secured to a body member such as a floor pan (not shown) by a plurality of fasteners (not shown) installed through respective mounting bosses 17. The shift lever 12 has secured to the upper end thereof a handgrip member 18 which includes a pushbutton 20 disposed therein. The pushbutton 20 is connected through a push rod 22 to a detent mechanism generally designated 24. The detent mechanism 24 includes a latch 26 and a latch plate 28. The detent latch plate 28 is secured to the base member 16 and includes an interior cutout or open portion, the upper end of which defines various detent notches respectively designated P (Park), R (Reverse), N (Neutral), D (Drive), etc. The latch 26 takes the form of a lever which is pivoted at its inner end at a pivot axis 29 formed near an inner wall of the yoke 14. The lever of latch 26 extends from axis 29 outward through a vertical slot 30 formed in the opposite wall of the yoke 14 for generally vertical reciprocation into and out of detenting engagement with the detent notches P, R, N, D, etc. A spring 32 is connected between the yoke 14 and the latch 26 for biasing the latch in an upward direction. Since the push rod 22 extends between pushbutton 20 and the upper surface of latch 26 between its pivot 29 and its outer end, the bias force of spring 32 similarly acts to bias pushbutton 20 and the connecting rod 22 into their non-actuated positions shown in FIG. 1.

The bias force of spring 32 is relatively modest. A relatively light manual inward force of approximately six pounds on pushbutton 20 is operative to urge the push rod 22 downward, thereby pivoting the outer end of latch 26 downward in its slot 30. Such downward actuation of latch 26 is required to permit the shift lever 12 to be pivoted from the Park position to one of the other positions P, R, N, D, etc. However, as noted above it has also become common to provide a P/L cam or member 34 which operates in conjunction with the key lock cylinder 36 associated with ignition switch 36A (depicted in FIG. 8) and an associated ignition lock mechanism 38 to lock the latch 26 into the Park detent notch in yoke 14 under certain circumstances, and thereby lock the shift lever 12 and the entire shift control mechanism in that position. The P/L member 34 in the illustrated embodiment is mounted for pivotal movement about a pivot axis 35, as represented by a journal pin or rivet in the illustrated embodiment. The pivot axis 35 is fixed with respect to the base member 16 and is conveniently supported either directly or indirectly by the base member 16. The P/L member 34 may take the very general shape of a bell-crank having one upstanding arm 37 adapted to receive an actuating force and a second arm 39 adapted to engage the underside of the outer end of latch 26 for urging the latch upwardly into a locked position within the Park detent notch. The P/L member 34 includes an arcuate slot 40 extending for much of the length of its arm 39 to provide a camming surface. A camming pin 42 is in fixed engagement with the sidewall of the yoke 14 of shift lever 12 and extends outward through the camming slot 40. The positioning of the camming pin 42 and the contour of the camming slot 40 are such that, as the shift lever 12 is pivoted between the various operating positions, the arm 39 of the P/L member 34 is either caused to pivot away from locking engagement with latch 26 or conversely, is permitted to be drawn upward via arm 37 for such locking engagement.

As in the aforementioned U.S. Pat. No. 4,474,085, when the shift level 12 is in the Park position, the P/L member 34 may be actuated into locking engagement with the latch 26 by means of a connecting cable 44 connected in tension between the P/L arm 37 and the ignition lock mechanism 38. Cable 44 is typically a flexible wire which is slidingly housed in a surrounding protective jacket 45. The jacket 45 is fixedly positioned at its end closest to P/L arm 37 by being clamped to support bracket 43 by clamping bracket 49. The support bracket is rigidly affixed to, and may be an integral part of, base 16. P/L arm 37 may include a slot 46 extending in from one edge and into which the cable 44 is placed. A head 47 on the end of the cable 44 serves to transmit a tensile force on the cable to the arm 37 and further resists dislodgement of the cable from the slot 46.

The ignition lock mechanism 38 associated with key lock cylinder 36 is depicted in a generalized diagrammatic form herein. The key lock cylinder 36 is in toothed engagement with a rack 48 connected to a slide 50. As the cylinder 36 is rotated clockwise from the Off position depicted in FIG. 1 to the On or Run position depicted in FIG. 2, the slide 50 is caused to reciprocate rightward. Such actuation of slide 52 serves also to close the contacts of the ignition switch 36A, seen in FIG. 8. The ignition lock mechanism 38 further includes a bellcrank type lock member 53 pivotally mounted on pivot axis 54 and biased by spring 56 to a withdrawn or retracted position depicted in FIG. 1. Though spring 56 is depicted for simplicity as a tension spring, it might be a torsion spring or the like. In that retracted position, the geometry and positioning of the lock 53 and slide 50 are such that, assuming the key lock cylinder 36 is Off, the lock member 53 will be blocked from clockwise rotation. Accordingly, the cable 44, which is connected at its upper end to the other crank leg of lock member 53, is also retained in a withdrawn and locked position. A notch 58 is provided in the upper surface of slide 50 and is of such depth and positioning that when key lock cylinder 36 is rotated clockwise to the On position depicted in FIG. 2, the slide 50 moves rightward and brings notch 58 in alignment with the end of lock member 53, thereby allowing clockwise rotation of the lever against its biasing spring 56 in the event a superior tensioning force is applied to the downstream end of the cable 44. Such superior force may be applied by the latch lever 26 in response to manual actuation of pushbutton 20 which requires a force of about ten pounds to overcome the bias of springs 32 and 56. That situation is depicted in FIG. 2.

In addition to the locking of the shift control mechanism 10 in the Park position when the key lock cylinder 36 is in its Off position, the present invention further provides a brake/shift interlock which is capable of continuing to maintain the shift control mechanism 10 in the Park position even when the key lock cylinder 36 is in the Run position commensurate with the engine running, and may be released principally only when a brake pedal is actuated to apply the vehicle's brakes. As will be evident, the present invention provides secondary or failure-mode means for releasing the P/L member 34 even in the event that actuation of the vehicle's brakes does not result in the normal and desired response.

In accordance with the invention, the brake/shift interlock is provided by an electromagnetic actuator, such as solenoid 60, operating through a connecting means such as the cable 44 to either lock or relatively release the P/L member 34 when shift level 12 is in the Park position. Specifically, and referring further to FIGS. 4 and 5, the solenoid 60 includes an armature or plunger 62 which engages the cable 44 in a manner resulting in the cable and the plunger moving in unison relative to the solenoid. The solenoid 60 is mounted in a fixed position within the vehicle, as represented by the bracket 61 in FIG. 1. The solenoid 60 includes a generally tubular housing 64 in which is fixedly positioned a bobbin assembly 65 comprised of a central bobbin 66 on which is wound a conventional multiturn electrical coil 67. The bobbin assembly 65 is typically further housed within a flux-conducting container comprised of a can 68A and an end cap 68B. The bobbin 66, the flux container 68A and 68B and the housing 64 include a coaxial central opening extending therethrough. A tubular electromagnetic stop member 69 is inserted and fixed in one end of the bobbin, as by press-fitted and/or bonded engagement therewith. The plunger 62 is tubular, having a hollow core extending axially therethrough and is sized to reciprocate within the bobbin 66 at the end opposite that in which the stop member 69 is positioned. Plunger 62 has a radial step in its outside diameter relatively toward its axially outer end to form an outward-facing shoulder or stop surface 70. The diameter of the opening 72 in solenoid housing 64 is sized to receive and clear only the smaller diameter end of plunger 62 such that the housing end wall limits outward travel of the plunger by engagement with the plunger stop surface 70 as depicted in FIG. 5.

The axial passage through stop member 69 is of sufficient diameter to clear the cable 44. Similarly, the axial passage or opening through plunger 62 may be sufficiently large to allow relative threading of cable 44 through the plunger during manufacture and assembly, however the plunger and the cable are then placed in fixed engagement with one another as by radially crimping the radially-reduced diameter of the plunger. In this way the plunger 62 grippingly engages cable 44 such that the two elements move in unison relative to housing 64 of solenoid 60.

Figure 4:
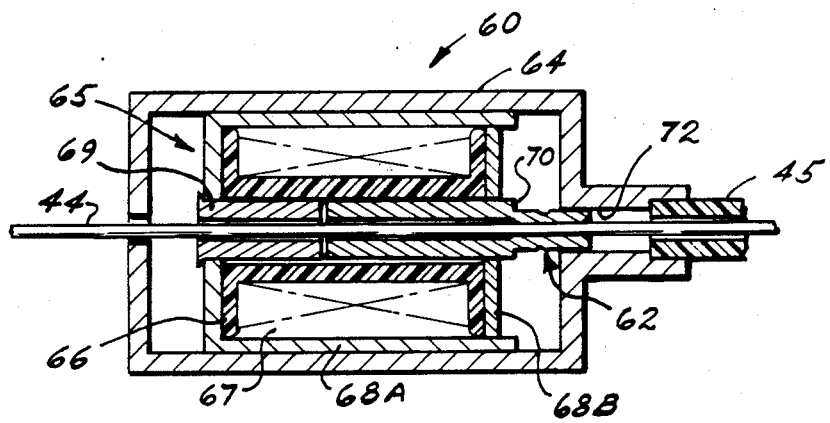
FIG. 4 depicts a solenoid particularly suited for use in the brake/shift interlock of FIGS. 1-3, including a cable extending therethrough and being shown in the energized state.
Figure 5:
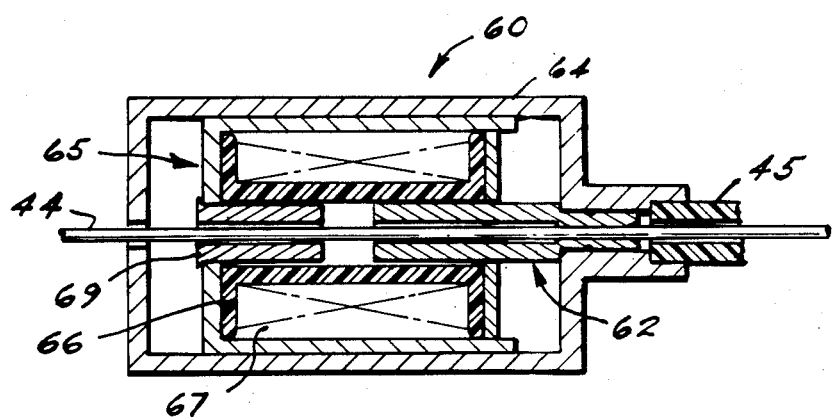
FIG. 5 shows the solenoid and cable combination of FIG. 4 with the solenoid in its de-energized state.

FIG. 4 depicts solenoid 60 in its energized state in which plunger 62 is drawn axially inward, whereas FIG. 5 depicts the solenoid in its de-energized state. Assuming the application of some external biasing force as will be explained hereinafter in greater detail, the plunger 62 may then move relatively outward to the position depicted in FIG. 5.

Returning to a consideration of the brake/shift interlock of FIGS. 1–3, it will be understood that energization of solenoid 60 via its coil 67 will result in a tensile force being applied to cable 44 in the region where it extends from the solenoid to the arm 37 of P/L member 34. This force may typically be such, when considering the mechanical advantage of shift control mechanism 10, that a force of approximately 35 pounds is required on pushbutton 20 to overcome the magnetic attractive force. Such a force is possible if two hands are used to depress pushbutton 20, thus providing the secondary or failure-mode means for releasing P/L member 34. On the other hand, when coil 67 of solenoid 60 is de-energized it is only necessary to overcome the modest bias force of return springs 56 and 32. Each of the foregoing assumes clockwise rotation of the lock member 53 is permitted by the ignition 36 being in the Run position.

Figure 8:
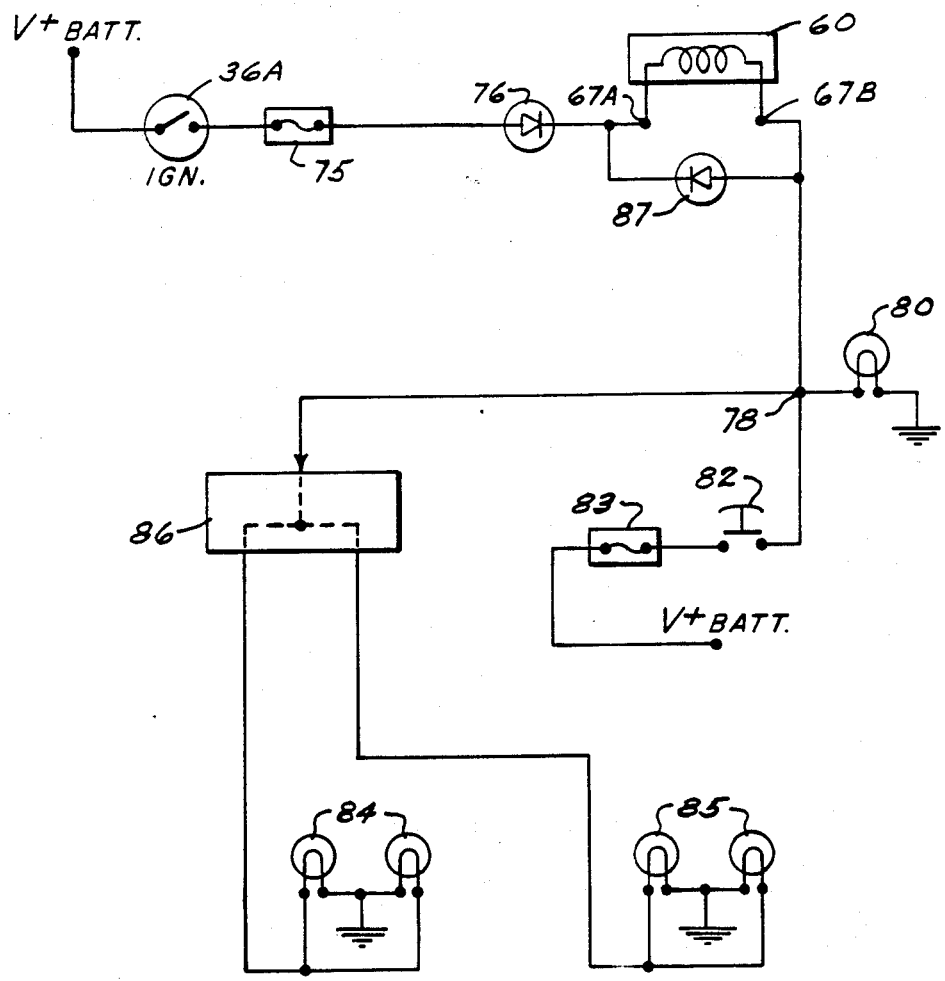
FIG. 8 is a generalized circuit diagram of the brake light power circuit which includes the ignition switch, various brake lights, the brake switch, and further showing the brake/shift interlock solenoid included therein in accordance with the invention.

Referring to FIG. 8, there is depicted a generalized schematic diagram of the power circuit into which the ends 67A and 67B of coil 67 of solenoid 60 are connected. Battery voltage of 12–14 volts ($V_{batt}$) is applied to an input terminal of ignition switch 36A. The output terminal of ignition switch 36A extends through a fuse 75 and a steering diode 76 to one terminal 67A of the coil of solenoid 60. In this way, when ignition switch 36A is closed to the Run position, $V_{batt}$ is applied to terminal 67 of solenoid 60. The other terminal 67B of solenoid 60 is connected to a junction 78 to which is also connected one terminal of a brake lamp 80 having its other terminal connected to ground. Also connected to junction 78 is one terminal of a normally-open brake switch 82 which has its other terminal connected through a fuse 83 to the battery supply potential, $V_{batt}$. Stop lamp 80 may be the conventional high level stop lamp on present day cars. In addition, left and right stop lamps 84 and 85 respectively may also have one terminal connected to junction 78 and the opposite terminal connected to ground. Left and right stop lamps 84 and 85 may be connected to junction 78 through a multifunction switch block 86 of conventional design which may additionally provide the well known turn signaling and hazard signaling functions. A suppression diode 87 spans the terminal 67A, 67B of the coil of solenoid 60. The brake switch 82 is of the type conventionally found in automobiles for closing an electrical circuit between and the various stops lamps 80, 84 and 85 when the operator depresses the brake pedal to actuate the brakes.

When the engine is running, or the ignition switch 36A is simply closed, battery voltage $V_{batt}$ is fed to the solenoid 60 and the solenoid is energized by completion of the path through any of the brake lights 80, 84, 85. Since only about 300 milliamperes of current is drawn by solenoid 60, brake lights 80, 84, 85 do not illuminate. With the coil of the solenoid 60 so energized, the plunger 62 will be held relatively inward to apply a tensile force to the cable 44 as it extends from the solenoid to P/L member 34 of the shift control mechanism 10. The tensile force on cable 44 applied by the magnetic field of solenoid 60 holds P/L member 34 in the position depicted in FIG. 1 and thus locks latch 26 in the Park detent position, despite the fact that the key lock cylinder 36 is in the Run position and clockwise rotation of the lock member 53 might otherwise have been permitted. When the brake pedal is depressed, and the brake switch 82 is thereby actuated to its closed condition, $V_{batt}$ potential is placed on the brake light circuit at junction 78, which thus also places that same potential on terminal 67B of the solenoid 60. Since substantially the same potential, $V_{batt}$, then appears on both terminals 67A and 67B of the solenoid 60, the solenoid will be de-energized, thereby releasing the plunger 62 and allowing normal shift operation as depicted in FIG. 2.

With the solenoid 60 de-energized during closure of the brake switch 82, the only tensile force being applied to cable 44 is that of the relatively weak return spring 56 in the ignition lock mechanism. On the other hand, a thumb-applied force of about ten pounds on pushbutton 20 is sufficient to overcome the bias of springs 56 and 32 and allow the latch 26 to be moved downward and similarly displace arm 39 of P/L member 34 downwardly as it rotates counterclockwise about pivot 35. This condition is depicted in FIG. 2, from which it will be evident that the shift lever 12 may then be pivoted out of the Park position to one of the other non-Park positions. When the shift lever 12 is in one of the other non-Park positions as depicted in FIG. 3, the placement of camming pin 42 with respect to the camming slot 40 is such as to hold the P/L arm 34 out of locking engagement with the latch 26. Camming pin 42 holds P/L member 34 in position, despite solenoid 60 being substantially continuously energized and applying a clockwise torque to member 34 via its connection through cable 44 to arm 37.

Although solenoid 60 will be de-energized each time the brake is depressed and brake switch 82 is closed, it will only operate to lock the shift control mechanism 10 in position if the shift lever 12 is in the Park position. Moreover, no noticeable noise resulting from actuation and de-actuation of the solenoid 60 will be heard in any position of the shift control mechanism 10.

Figure 6:
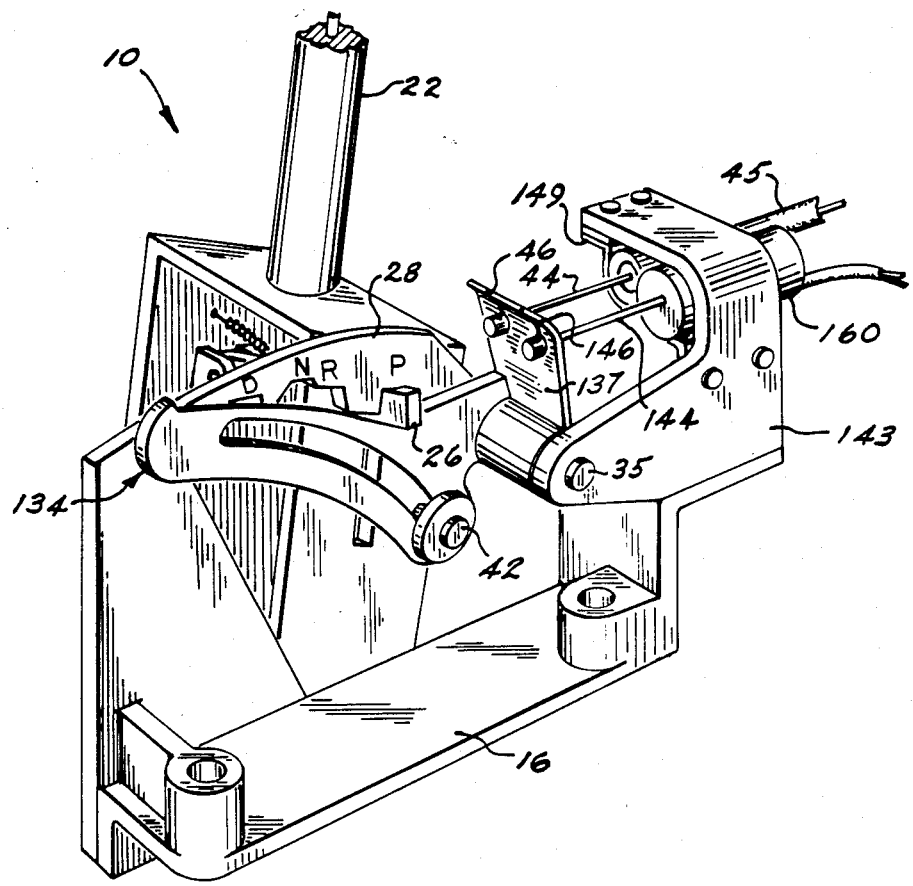
FIG. 6 depicts a second embodiment of the brake/shift interlock in combination with the shift control mechanism, and showing the locked Park position of FIG. 1.
Figure 7:
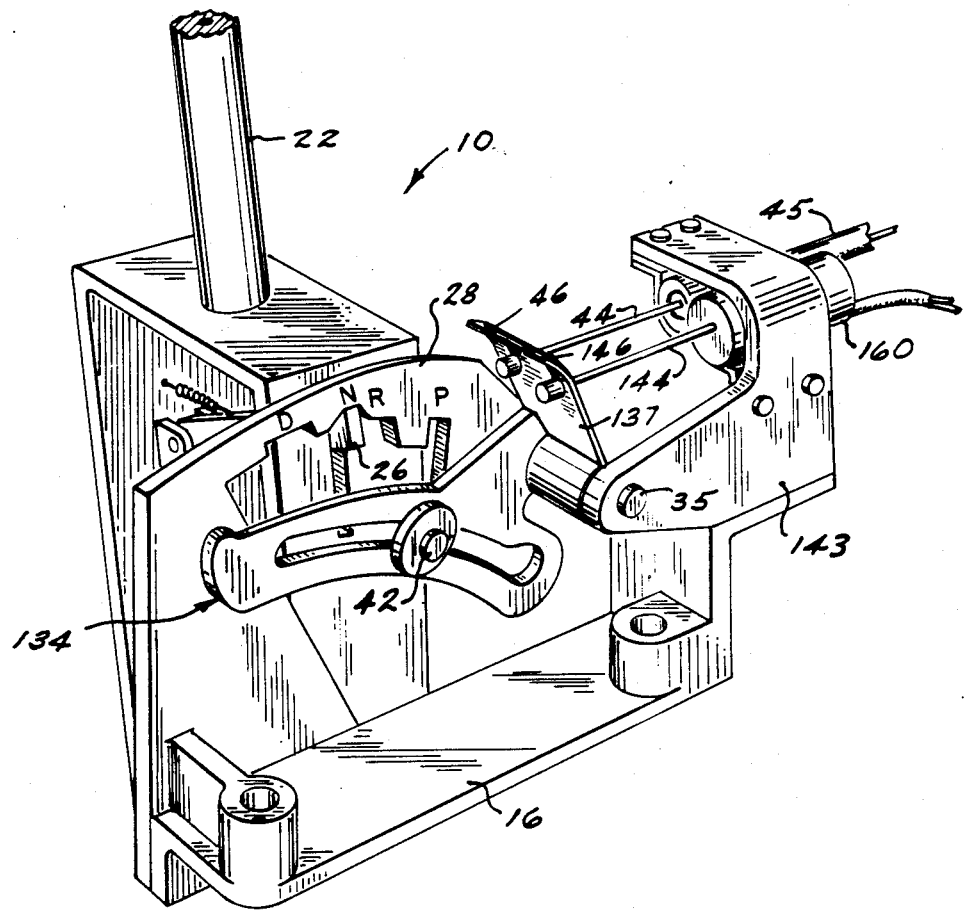
FIG. 7 shows the brake/shift interlock embodiment of FIG. 6 with the control shift mechanism depicted in a non-Park position as in FIG. 3.

Attention is now directed to an alternate embodiment of the brake/shift interlock as depicted in FIGS. 6 and 7. In those figures, the parts identical to parts previously described in connection with the embodiment of FIGS. 1–3 will bear the identical reference numerals. The embodiment of FIGS. 1–3, which employed the solenoid construction of FIGS. 4 and 5, depicted the ignition lock mechanism and the brake/shift interlock as being arranged mechanically in series. The embodiment of FIGS. 6 and 7 depicts those two locking functions as being arranged mechanically in parallel. The arm 137 of P/L member 134 is depicted as being widened and having a pair of slots 46 and 146 for respectively receiving flexible cables 44 and 144, though the single slot 46 of P/L member might have been used for both cables. Cable 144 is slidingly housed in jacket 45 and is connected to the conventional ignition lock mechanism 38 depicted in FIG. 1, however the solenoid is completely omitted from that mechanical link between the ignition lock mechanism and the P/L member 134. On the other hand, a solenoid 160 is mounted to a support bracket 143 by means of a clamping bracket 149 which also supports the end of cable jacket 45. The solenoid 160 may be identical to solenoid 60 of FIGS. 4 and 5, but typically is of a more standard configuration in which the plunger (not shown) need not be hollow and simply includes means for connecting the flexible cable 144 to the outermost end thereof. Otherwise, the solenoid 160 is connected in the brake light power circuit in the same manner as previously depicted and discussed with respect to FIG. 8. It may be advantageous to provide a return spring associated with the plunger of solenoid 160.

Having thus described a typical embodiment of the invention, that which is claimed as new and desired to secure by Letters Patent of the United States is:

1. A brake/shift interlock for use in a vehicle having a shift control mechanism for an automatic transmission, the transmission having a Park mode and non-Park modes, the shift control mechanism having a shift lever for controlling selection of the transmission modes, a detent mechanism having a latch and latch plate, the latch being adapted to be in detented engagement with respective detent notches in the latch plate, one said detent notch coinciding with a Park position of the shift lever, and the latch being selectively, manually actuable out of said detented engagement with a respective said detent notch, and a Park/Lock member actuable to lock said latch in said Park position detent notch, the vehicle having an ignition switch having Off and Run positions, an ignition lock mechanism associated with the ignition switch and connected with said Park/Lock member for actuating said Park/Lock member to a Lock position to maintain said latch locked in said Park position detent notch when the ignition switch is in its Off position, and a brake switch connected in an electrical power circuit and adapted to be actuated in conjunction with actuation of vehicle brakes, the brake/shift interlock comprising:
   an electromagnetic actuator;
   means for connecting said electromagnetic actuator electrically in said power circuit including said brake switch to control operation of said actuator as a function of said actuation of said brake switch; and
   means for mechanically connecting said electromagnetic actuator directly with the Park/Lock member, said electromagnetic actuator being energizable for placing said connecting means in tension and urging said Park/Lock member toward said Lock position.

2. The brake/shift interlock of claim 1 wherein the Park/Lock member is mounted on a pivot axis and an off-axis force supplied to said Park/Lock member by said ignition lock mechanism operates to actuate said Park/Lock member toward said Lock position to lock said latch in said Park position.

3. The brake/shift interlock of claim 2 wherein said electromagnetic actuator is connected with said Park/Lock member by said connecting means to provide an off-axis force thereto substantially in the manner provided by said ignition lock mechanism, both said ignition lock mechanism and said connecting means engage said Park/Lock member in tension to actuate said Park Lock member toward said Lock position to lock said latch in said Park position detent notch.

4. The brake /shift interlock of claim 3 wherein said electromagnetic actuator and said connecting means exist mechanically in parallel with said ignition lock mechanism.

5. The brake/shift interlock of claim 3 wherein said electromagnetic actuator and said connecting means are connected mechanically in series with said ignition lock mechanism.

6. The brake/shift interlock of claim 5 wherein said ignition lock mechanism includes a cable connected to said Park/Lock member, said electromagnetic actuator comprises a solenoid, said solenoid including a plunger and wherein said cable is in fixed engagement with said plunger for also providing said connecting means.

7. The brake/shift interlock of claim 6 wherein said solenoid plunger is tubular and hollow and said cable extends through said hollow plunger and is in fixed engagement therewith.

8. The brake/shift interlock of claim 3 wherein when the ignition switch is in the Run position, said power circuit is operative when said solenoid is connected therein to apply an energizing potential across said solenoid and said brake switch is effectively connected in parallel across said solenoid, said brake switch being normally open and being operative upon its said actuation in conjunction with brake actuation to de-energize said solenoid.

9. The brake/shift interlock of claim 8 wherein said power circuit comprises one side of said ignition switch being connected to the energizing potential, the other side of said ignition switch being connected to one side of said solenoid, the other side of said solenoid being connected to a junction including one side of a lamp and one side of the brake switch, the other side of the lamp being connected to ground potential and the other side of said brake switch being connected to substantially the same potential as said energizing potential.

10. In combination in a vehicle having brakes, an ignition switch having Off and Run positions and a shift control mechanism for an automatic transmission having a Park mode and non-Park modes, the shift control mechanism having a shift lever for controlling selection of the transmission modes, a detent mechanism having a latch and a latch plate, the latch being adapted to be in detented engagement with respective detent notches in the latch plate, one said detent notch coinciding with a Park position of the shift lever and the latch being selectively, manually actuable out of said detented engagement with a respective detent notch, and a Park/Lock member actuable to lock said latch in said Park position detent notch, an ignition lock mechanism associated with the ignition switch and connected with said Park/Lock member for actuating said Park/Lock member to a Lock position to maintain said latch lock in said Park position detent notch when the ignition switch is in its Off position, a brake switch connected in an electrical power circuit and adapted to be actuated in conjunction with actuation of the brakes, and a brake/shift interlock comprising a solenoid, means connecting the solenoid electrically in said power circuit including said brake switch to control operation of said solenoid as a function of said actuation of said brake switch, and means for mechanically connecting said solenoid directly with the Park/Lock member, said solenoid being energizable to tension said connecting means and thereby maintain said Park/Lock member in said Lock position.

11. The combination of claim 10 wherein the Park/Lock member is pivotally mounted on a pivot axis, and both said ignition lock mechanism and said brake/shift interlock are connected to said Park/Lock member to provide respective off-axis tensile forces thereto for actuating said Park/Lock member to said Lock position.

12. The combination of claim 11 wherein said solenoid and said connecting means are connected mechanically in series with said ignition lock mechanism.

13. The combination of claim 12 wherein the solenoid includes a plunger, said plunger being tubular and hollow and wherein said connecting means comprises a cable extending through said hollow plunger and being in fixed engagement therewith.

14. The combination of claim 10 wherein when the ignition switch is in the Run position, said power circuit is operative when said solenoid is connected therein to apply an energizing potential across said solenoid and said brake switch is effectively connected in parallel across said solenoid, said brake switch being normally open and being operative upon its said actuation in conjunction with brake actuation to de-energize said solenoid.

15. In combination, a solenoid and a connecting cable, the solenoid including a housing, a bobbin assembly fixedly positioned in the housing, the bobbin assembly including a central bobbin having a hollow core, a tubular plunger axially movable in the hollow core of the bobbin, the plunger having an opening extending axially therethrough, the housing being open at axially opposite ends in register with the opening in said plunger, the connecting cable extending continuously through said solenoid via said openings in said housing and said opening in said plunger, said plunger being in fixed engagement with said cable for reciprocation in unison relative to said solenoid housing, said solenoid plunger having a first outside diameter at its axially outer end which is less than a second outside diameter axially inward thereof to form an axially facing stop surface at the transition therebetween, said plunger axially outer end extending through a particular said opening in said solenoid housing, and the diameter of said plunger stop surface being greater than said particular opening in said plunger housing to limit outward travel of said plunger.

16. The combination of claim 15 wherein said solenoid plunger is radially crimped into engagement with said connecting cable to effect said fixed engagement therewith.

17. The combination of claim 15 wherein said solenoid further includes a hollow tubular stop member fixedly positioned within said hollow core in said bobbin for limiting reciprocation of said plunger in the direction opposite that of said plunger outer end, said connecting cable extending freely through said stop member.

18. The combination of claim 15 wherein said solenoid is adapted to be fixedly positioned and said connecting cable is adapted to be connected to mechanical loads at its opposite ends; at least one of the mechanical loads being capable of movement relative to the solenoid.

* * * * *